United States Patent
Frydman et al.

(10) Patent No.: US 10,348,573 B2
(45) Date of Patent: Jul. 9, 2019

(54) METHODS, CIRCUITS, DEVICES, SYSTEMS AND ASSOCIATED COMPUTER EXECUTABLE CODE FOR FACILITATING LOCAL HOSTING AND ACCESS OF INTERNET BASED INFORMATION

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 531 days.

(21) Appl. No.: 14/459,343

(22) Filed: Aug. 14, 2014

(65) Prior Publication Data

US 2014/0358715 A1 Dec. 4, 2014

Related U.S. Application Data

(63) Continuation-in-part of application No. 14/045,047, filed on Oct. 3, 2013, which is a continuation-in-part of application No. 13/739,067, filed on Jan. 11, 2013, and a continuation-in-part of application No. 13/861,192, filed on Apr. 11, 2013, which is a
(Continued)

(51) Int. Cl.
*H04W 4/02* (2018.01)
*G06Q 30/04* (2012.01)
*G06Q 30/08* (2012.01)
*H04L 12/24* (2006.01)
(Continued)

(52) U.S. Cl.
CPC .............. *H04L 41/12* (2013.01); *G06Q 30/04* (2013.01); *G06Q 30/08* (2013.01); *H04L 41/28* (2013.01); *H04W 4/02* (2013.01); *H04L 45/306* (2013.01); *H04W 40/02* (2013.01)

(58) Field of Classification Search
CPC ........... H04L 61/1511; H04L 29/12066; H04L 12/2856; H04L 12/2859
See application file for complete search history.

(56) References Cited

U.S. PATENT DOCUMENTS 6,327,622 B1 * 12/2001 Jindal .................. G06F 9/5055
709/228
8,065,417 B1 * 11/2011 Richardson ...... H04N 21/26241
709/226

(Continued)

*Primary Examiner* — Scott B Christensen
(74) *Attorney, Agent, or Firm* — Vladimir Sherman; Professional Patent Solutions

(57) ABSTRACT

Disclosed are methods, circuits, devices, systems and associated computer executable code for facilitating local hosting and access of internet based information. Zone Specific Hosting Server(s) host content associated with a specific zone of a wireless or cellular network, while Zone Specific Domain Name System Server(s) store Domain Name System records of content stored on the Zone Specific Hosting Server(s). A Hosting Deployment System deploys content to one or more of the Zone Specific Hosting Server(s) and updates the records of the Zone Specific Domain Name System Server(s) in accordance, and a Transparent Breakout Engine allows access and directs client devices of the wireless or cellular network to content hosted on the Zone Specific Hosting Server(s) based on the Zone Specific Domain Name System Server(s) records.

12 Claims, 7 Drawing Sheets

Related U.S. Application Data continuation-in-part of application No. 13/739,067, filed on Jan. 11, 2013.

(60) Provisional application No. 61/940,510, filed on Feb. 17, 2014, provisional application No. 61/723,356, filed on Nov. 7, 2012, provisional application No. 61/585,251, filed on Jan. 11, 2012, provisional application No. 61/622,574, filed on Apr. 11, 2012.

(51) Int. Cl.
*H04W 40/02* (2009.01)
*H04L 12/725* (2013.01)

(56) References Cited

U.S. PATENT DOCUMENTS

| | | | | |
|---|---|---|---|---|
| 8,468,247 B1* | 6/2013 | Richardson | H04L 67/18 | 370/329 |
| 8,521,851 B1* | 8/2013 | Richardson | H04L 61/1511 | 709/220 |
| 8,521,880 B1* | 8/2013 | Richardson | G06F 15/17306 | 705/500 |
| 2002/0178214 A1* | 11/2002 | Brittenham | G06F 9/5027 | 709/203 |
| 2003/0154249 A1* | 8/2003 | Crockett | H04W 4/08 | 709/204 |
| 2007/0143851 A1* | 6/2007 | Nicodemus | G06F 21/55 | 726/25 |
| 2009/0043648 A1* | 2/2009 | Mahdian | G06Q 30/02 | 705/14.39 |
| 2009/0248697 A1* | 10/2009 | Richardson | G06F 12/0813 | |
| 2009/0327487 A1* | 12/2009 | Olson | H04L 29/12066 | 709/224 |
| 2010/0325624 A1* | 12/2010 | Bartolo | G06F 8/61 | 717/176 |
| 2010/0332615 A1* | 12/2010 | Short | H04L 63/08 | 709/217 |
| 2011/0145317 A1* | 6/2011 | Serban | H04W 4/00 | 709/203 |
| 2011/0202821 A1* | 8/2011 | Roy | G06Q 30/02 | 715/201 |
| 2011/0235595 A1* | 9/2011 | Mehta | H04W 8/082 | 370/329 |
| 2011/0299410 A1* | 12/2011 | Diab | G06Q 20/10 | 370/252 |
| 2012/0099429 A1* | 4/2012 | Ludwig | H04L 43/028 | 370/235 |
| 2012/0278229 A1* | 11/2012 | Vishwanathan | G06Q 20/123 | 705/40 |
| 2013/0109412 A1* | 5/2013 | Nguyen | G06Q 30/0207 | 455/456.3 |
| 2013/0178195 A1* | 7/2013 | Luna | H04W 24/04 | 455/414.1 |
| 2014/0108941 A1* | 4/2014 | Joel | G06F 17/30905 | 715/738 |
| 2014/0149552 A1* | 5/2014 | Carney | H04L 67/32 | 709/219 |
| 2014/0188632 A1* | 7/2014 | Goel | G06Q 30/0275 | 705/14.71 |
| 2014/0207818 A1* | 7/2014 | Jellick | H04L 41/082 | 707/771 |
| 2014/0281032 A1* | 9/2014 | Roskind | G06F 17/30861 | 709/245 |
| 2014/0297868 A1* | 10/2014 | Ennaji | H04L 47/828 | 709/226 |
| 2014/0359045 A1* | 12/2014 | Mirarchi | H04L 67/2842 | 709/213 |
| 2015/0146722 A1* | 5/2015 | Wainner | H04L 45/742 | 370/392 |
| 2015/0317697 A1* | 11/2015 | Samet | G06Q 30/0275 | 705/14.43 |

* cited by examiner

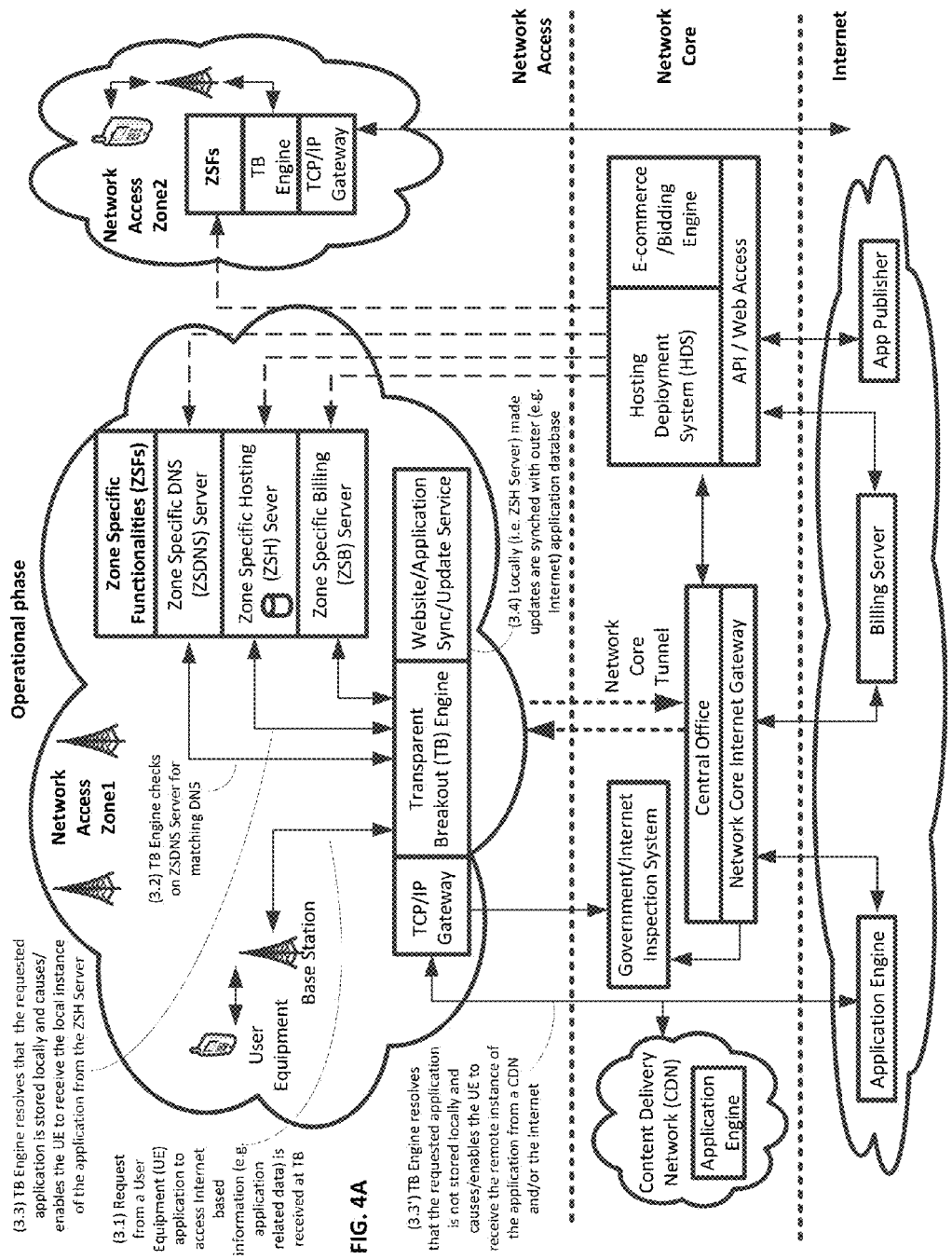

METHODS, CIRCUITS, DEVICES, SYSTEMS AND ASSOCIATED COMPUTER EXECUTABLE CODE FOR FACILITATING LOCAL HOSTING AND ACCESS OF INTERNET BASED INFORMATION

PRIORITY AND CONTINUITY CLAIMS

The present Application claims priority from U.S. Provisional Patent Application No. 61/940,510, filed by the inventors of the present invention, titled "Software, Apparatus, Systems and Methods for Local Access to Internet Based Information and Services and Business Methods associated with the same", filed on Feb. 17, 2014; The present Application is a continuation in part of U.S. patent application Ser. No. 14/045,047, filed by the inventor of the present invention, titled "METHODS CIRCUITS DEVICES SYSTEMS AND ASSOCIATED COMPUTER EXECUTABLE CODE FOR PROVIDING DATA CONNECTIVITY BETWEEN A MOBILE COMMUNICATION DEVICE COMMUNICATIVELY COUPLED TO A MOBILE COMMUNICATION NETWORK AND A THIRD PARTY DATA SOURCE", filed on Oct. 3, 2013;

U.S. patent application Ser. No. 14/045,047, claims the priority of U.S. Provisional Patent Application 61/723,356, filed Nov. 7, 2012, the disclosures of which are incorporated herein by reference in their entirety;

U.S. patent application Ser. No. 14/045,047, is also a Continuation in Part of U.S. patent application Ser. No. 13/739,067, filed Jan. 11, 2013 and entitled "METHODS, CIRCUITS, DEVICES, SYSTEMS AND ASSOCIATED COMPUTER EXECUTABLE CODE FOR PROVIDING DOMAIN NAME RESOLUTION", which claims the benefit of U.S. Provisional Patent Application 61/585,251, filed Jan. 11, 2012, the disclosures of which are incorporated herein by reference in their entirety;

U.S. patent application Ser. No. 14/045,047, is also a Continuation in Part of U.S. patent application Ser. No. 13/861,192, filed Apr. 11, 2013 and entitled "METHODS, CIRCUITS, DEVICES, SYSTEMS AND ASSOCIATED COMPUTER EXECUTABLE CODE FOR FACILITATING ACCESS TO A CONTENT SOURCE THROUGH A WIRELESS MOBILE NETWORK", which claims the benefit of U.S. Provisional Patent Application 61/622,574, filed Apr. 11, 2012 and U.S. Provisional Patent Application 61/723,356, filed Nov. 7, 2012, U.S. patent application Ser. No. 13/861,192 is also a Continuation in Part of U.S. patent application Ser. No. 13/739,067, filed Jan. 11, 2013 and the disclosures of which are incorporated herein by reference in their entirety;

all of the aforementioned applications are hereby incorporated herein by reference in their entirety.

FIELD OF THE INVENTION

Some embodiments relate generally to the fields of communication and content delivery, and more particularly, to methods, circuits, devices, systems and associated computer executable code for facilitating local hosting and access of internet based information, which internet based information may optionally include computer applications and/or computer applications associated data.

BACKGROUND

Web caching/hosting is the temporary storage of web objects (such as HTML documents) for later retrieval. There are three significant advantages to web caching: reduced bandwidth consumption (fewer requests and responses that need to go over the network), reduced server load (fewer requests for a server to handle), and reduced latency (since responses for cached requests are available immediately, and closer to the client being served). Together, they make the web less expensive and better performing.

Caching can be performed by the client application, and is built in to most web browsers. There are a number of products that extend or replace the built-in caches with systems that contain larger storage, more features, or better performance. In any case, these systems cache net objects from many servers but all for a single user.

Caching can also be utilized in the middle, between the client and the server as part of a proxy. Proxy caches are often located near network gateways to reduce the bandwidth required over expensive dedicated internet connections. These systems serve many users (clients) with cached objects from many servers. In fact, much of the usefulness (reportedly up to 80% for some installations) is in caching objects requested by one client for later retrieval by another client. For even greater performance, many proxy caches are part of cache hierarchies, in which a cache can inquire of neighboring caches for a requested document to reduce the need to fetch the object directly.

Finally, caches can be placed directly in front of a particular server, to reduce the number of requests that the server must handle. Most proxy caches can be used in this fashion, but this form has a different name (reverse cache, inverse cache, or sometimes httpd accelerator) to reflect the fact that it caches objects for many clients but from (usually) only one server.

There still remains a need, in the fields of content delivery and local data hosting, caching and/or access, for solutions that may facilitate local hosting of internet based information such as, but not limited to, zone specific content and application engine hosting on mobile networks.

SUMMARY OF THE INVENTION

The present invention includes methods, circuits, devices, systems and associated computer executable code for facilitating local hosting and access of internet based information. Content and application engine hosting may be provided over zone specific resources in communicative proximity with one or more access points of a zone of a wireless or cellular network.

According to some embodiments, one or more client devices (e.g. wireless, mobile devices) may access content hosted on the zone specific hosting resources (such as, and hereinafter, ZSH (Zone Specific Hosting) Server(s)) using a zone specific TCP/IP breakout or gateway (such as, and hereinafter, TB (Transparent Breakout) Engine) which is either integral or otherwise functionally associated with the one or more access points. One or more client devices, requesting given content, may be directed to the zone specific hosting resources (ZSH (Zone Specific Hosting) Server(s)) by a zone specific DNS (hereinafter ZSDNS Server), wherein one or more 'given content corresponding' records, on the ZSDNS Server, have been updated in accordance with the deployment, and/or in accordance with one or more updates, of the given content, to a server(s) of the zone specific hosting resources.

According to some embodiments, a hosting deployment system (HDS) may provide external access to the ZSH Server(s). The HDS may regulate resources (e.g. storage, CPU, bandwidth) allocation, deployment and uploading of content, and/or ZSDNS updating. The HDS may be functionally associated with an e-commerce platform (hereinafter E-commerce/Bidding Engine) adapted to present financial offers for zone specific hosting services, accept financial bids, select winning bids and authorize transactions in accordance, perform ongoing billing and/or the like.

According to some embodiments of the present invention, a system for facilitating local hosting and access of internet based information may include: (1) A Hosting Deployment System (HDS) to deploy content to one or more zone specific hosting (ZSH) Server(s) and update records of one or more zone specific DNS (ZSDNS) Server(s) in accordance; (2) The one or more ZSH Server(s) to host content associated with a specific zone of a wireless or cellular network; (3) The one or more ZSDNS Server(s) to each store DNS records of content deployed to one or more of the one or more ZSH Server(s); and/or (4) a Transparent Breakout (TB) Engine to allow access of, and direct, client devices of the wireless or cellular network—to user requested content hosted on ZSH Server(s)—based on ZSDNS Server(s) records.

According to some embodiments of the present invention, the Hosting Deployment System (HDS) may further: (1) verify and approve/deny content/applications to be deployed to ZSH Server(s), (2) provide external access to the ZSH Server(s), and/or (3) regulate ZSH Server(s) resources allocation (e.g. storage, CPU, bandwidth). According to some embodiments, the Hosting Deployment System (HDS) may include, and/or may be functionally associated with, an E-commerce/Bidding Engine to: (1) present financial offers for zone specific hosting services, (2) accept financial bids for offered services from content/application up-loaders/publishers, (3) select winning bids and authorize transactions in accordance, and/or (4) perform ongoing billing.

According to some embodiments of the present invention, the TB Engine and/or the ZSH Server(s) of a specific network zone, may include, and/or may be functionally associated with, a respective Zone Specific Billing (ZSB) Server to monitor access and usage of content and/or applications hosted on the ZSH Server(s) in that specific network zone, and to accordingly handle zone specific billing tasks.

According to some embodiments of the present invention, the TB Engine and/or the ZSH Server(s) of a specific network zone, may include, and/or may be functionally associated with a Website/Application Sync/Update Service to monitor and relay data indicative of changes made to/using content or applications hosted on ZSH Server(s), to corresponding externally (e.g. Internet) stored versions of the same content or applications; and/or receive data indicative of changes made to/using externally (e.g. Internet) stored content or applications, and to embed the externally made changes into corresponding content or applications versions locally hosted on ZSH Server(s).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is a functional block diagram showing the main sub-systems, modules, components, and relationships, of an exemplary system for facilitating local hosting and access of internet based information; wherein, as part of the operation process, user requested application information is accessed either locally (ZSH server(s)), and/or externally (the Internet), based on the availability or unavailability, of a corresponding local DNS record on a ZSDNS Server(s), in accordance with some embodiments of the present invention.

Figure 1:
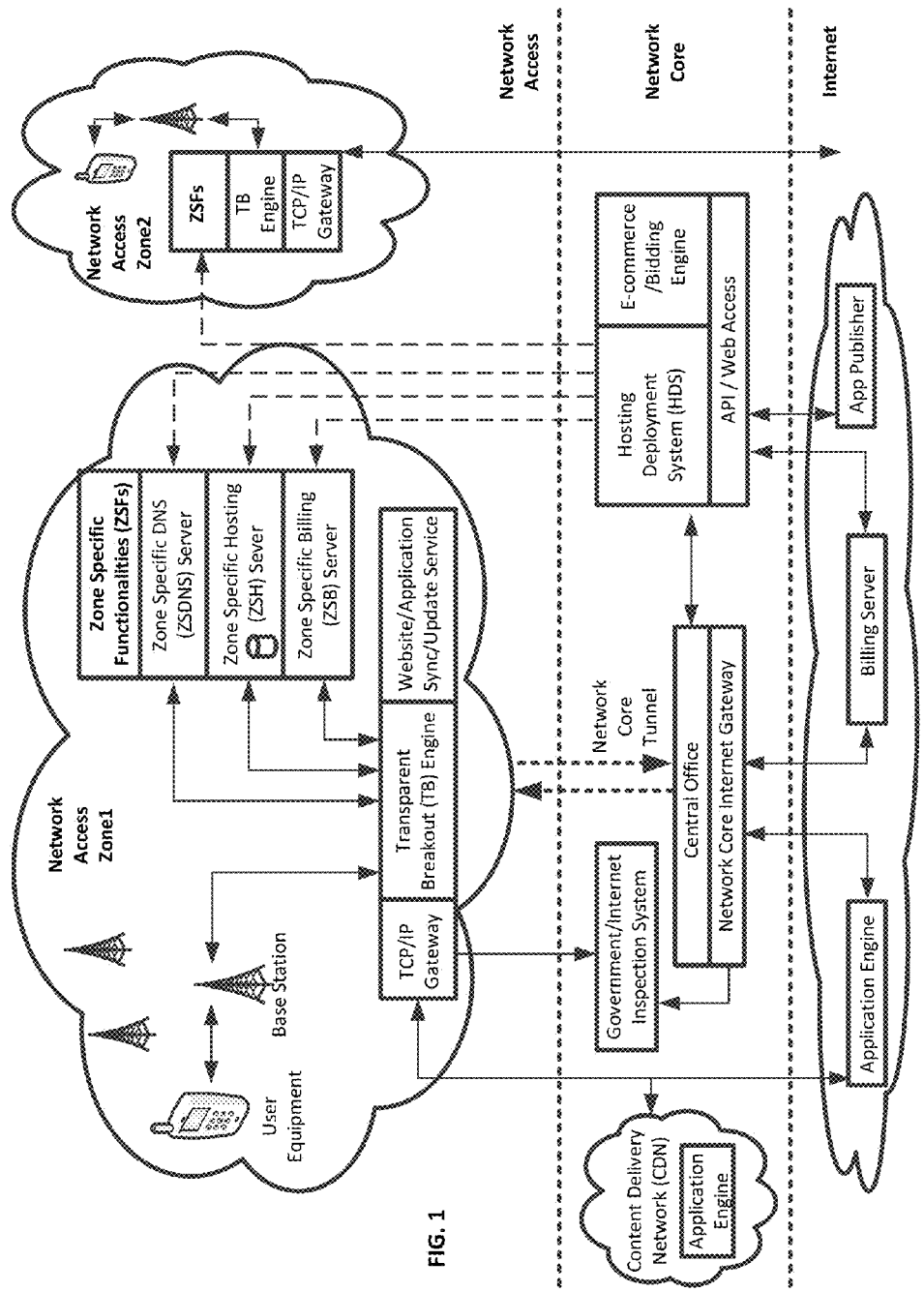
FIG. 1 is a functional block diagram showing the main sub-systems, modules, components, and relationships, of an exemplary system for facilitating local hosting and access of internet based information, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

The present invention includes methods, circuits, devices, systems and associated computer executable code for facilitating local hosting and access of internet based information. Content and application engine hosting may be provided over zone specific resources in communicative proximity with one or more access points of a zone of a wireless or cellular network.

According to some embodiments, one or more client devices (e.g. wireless, mobile devices) may access content hosted on the zone specific hosting resources (such as, and hereinafter, ZSH (Zone Specific Hosting) Server(s)) using a zone specific TCP/IP breakout or gateway (such as, and hereinafter, TB (Transparent Breakout) Engine) which is either integral or otherwise functionally associated with the one or more access points. One or more client devices, requesting given content, may be directed to the zone specific hosting resources (ZSH (Zone Specific Hosting) Server(s)) by a zone specific DNS (hereinafter ZSDNS Server), wherein one or more 'given content corresponding' records, on the ZSDNS Server, have been updated in accordance with the deployment, and/or in accordance with one or more updates, of the given content, to a server(s) of the zone specific hosting resources.

According to some embodiments, a hosting deployment system (HDS) may provide external access to the ZSH Server(s). The HDS may regulate resources (e.g. storage, CPU, bandwidth) allocation, deployment and uploading of content, and/or ZSDNS updating. The HDS may be functionally associated with an e-commerce platform (hereinafter E-commerce/Bidding Engine) adapted to present financial offers for zone specific hosting services, accept financial bids, select winning bids and authorize transactions in accordance, perform ongoing billing and/or the like.

According to some embodiments of the present invention, a system for facilitating local hosting and access of internet based information may include: (1) A Hosting Deployment System (HDS) to deploy content to one or more zone specific hosting (ZSH) Server(s) and update records of one or more zone specific DNS (ZSDNS) Server(s) in accordance; (2) The one or more ZSH Server(s) to host content associated with a specific zone of a wireless or cellular network; (3) The one or more ZSDNS Server(s) to each store DNS records of content deployed to one or more of the one or more ZSH Server(s); and/or (4) a Transparent Breakout (TB) Engine to allow access of, and direct, client devices of the wireless or cellular network—to user requested content hosted on ZSH Server(s)—based on ZSDNS Server(s) records.

According to some embodiments of the present invention, the Hosting Deployment System (HDS) may further: (1) verify and approve/deny content/applications to be deployed to ZSH Server(s), (2) provide external access to the ZSH Server(s), and/or (3) regulate ZSH Server(s) resources allocation (e.g. storage, CPU, bandwidth). According to some embodiments, the Hosting Deployment System (HDS) may include, and/or may be functionally associated with, an E-commerce/Bidding Engine to: (1) present financial offers for zone specific hosting services, (2) accept financial bids for offered services from content/application up-loaders/publishers, (3) select winning bids and authorize transactions accordingly, and/or (4) perform ongoing billing.

According to some embodiments of the present invention, the TB Engine and/or the ZSH Server(s) of a specific network zone, may include, and/or may be functionally associated with, a respective Zone Specific Billing (ZSB) Server to monitor access and usage of content and/or applications hosted on the ZSH Server(s) in that specific network zone, and to accordingly handle zone specific billing tasks.

According to some embodiments of the present invention, the TB Engine and/or the ZSH Server(s) of a specific network zone, may include, and/or may be functionally associated with a Website/Application Sync/Update Service to monitor and relay data indicative of changes made to/using content or applications hosted on ZSH Server(s), to corresponding externally (e.g. Internet) stored versions of the same content or applications; and/or receive data indicative of changes made to/using externally (e.g. Internet) stored content or applications, and to embed the externally made changes into corresponding content or applications versions locally hosted on ZSH Server(s).

According to some embodiments of the present invention, a content/application deployment process executed by an HDS, possibly as part of a system for facilitating local hosting and access of internet based information, may include the following steps: (1) The HDS may receive a content/application deployment request through an API/Web-Access and may possibly conduct a verification process to approve or deny hosting of the content/application; (2) The E-commerce/Bidding-Engine may provide offers for hosting the content/application at one or more specific hosting zones; and/or (3) Upon selection of one or more specific hosting zones, designators of selected hosting zone(s) and relevant content/application may be relayed to the HDS that may: deploy the content/application on ZSH Server(s) at selected zones, trigger ZSDNS Server updates in accordance with the content/application deployment for later access/retrieval, and/or set up a ZSB Server account(s)/profile(s) for the content/application and/or its publisher/up-loader. According to some embodiments, a substantially similar process may be executed for the updating of a content/application previously deployed to SZH Server(s).

According to some embodiments of the present invention, a content/application updating process executed by a TB Engine and a Website/Application Sync/Update Service, possibly as part of a system for facilitating local hosting and access of internet based information, may include the following steps: (1) The TB Engine may receive information (e.g. through a cellular network Base Station) associated with a ZSH Server(s) hosted content/application being accessed by a networked User Equipment (UE), and relay/synch/update received information to/with the ZSH Server(s) hosted content/application and/or database thereof; (2) The Website/Application Synch/Update Service may issue updates based on the information relay/sync/update made to/with the ZSH Server(s) hosted content/application and/or database thereof; and/or (3) The TB Engine may relay/synch issued updates to/with a corresponding externally stored content/application (e.g. CDN, Internet stored/hosted content/application/database) to harmonize with locally made changes.

According to some embodiments of the present invention, a content/application accessing process executed by a TB Engine and a ZSDNS Server, possibly as part of a system for facilitating local hosting and access of internet based information, may include the following steps: (1) The TB Engine may receive a request from a UE application to access/edit information (e.g. content, application related data); (2) The TB Engine may reference the ZSDNS Server(s) and check for matching DNS records; (3) If matching DNS records are found on ZSDNS Server(s) the TB Engine may resolve that the requested content/application is stored locally, may accordingly cause/enable the UE to receive a local version/instance of the content/application information from the ZSH Server(s), and may issue updates (e.g. using the Website/Application Synch/Update Service) for Locally (i.e. ZSH Server(s)) made updates and relay/synch them with outer (e.g. CDN, Internet) content/application/database versions/instances; and/or (4) If, conversely, matching DNS records are not found on ZSDNS Server(s) the TB Engine may resolve that the requested content/application is not stored locally and causes/enables the UE to receive a remote version/instance of the content/application information from a CDN and/or the Internet.

In FIG. 1 there is shown, a functional block diagram of the main sub-systems, modules, components, and relationships, of an exemplary system for facilitating local hosting and access of internet based information, in accordance with some embodiments of the present invention. An HDS deploys content/applications to specific ZSH Server(s), at one or more Network Access Zones, based on winning bids selected by a functionally associated E-commerce/Bidding Engine from within financial bids for offered ZSH services, made by content/application up-loaders/publishers. The HDS further updates ZSDNS and Billing Servers associated with the selected ZSH Server(s).

A TB Engine, receiving content/application access requests from respective Network Access Zone UEs, references corresponding ZSDNS Server(s) to verify whether the requested content/application is locally hosted on ZSH Server(s). If the requested content/application is locally hosted, the TB Engine directs the UE request to the local ZSH Servers, if a local copy of the requested content/application does not exist, and/or no corresponding SZDNS records have been updated in accordance with its deployment/updating, the UE request is directed to an Internet or CDN hosted content/application. A Website/Application Sync/Update Service, functionally associated with the TB Engine, manages the generating and relaying of updates of locally made changes to ZSH content/application records to corresponding remotely hosted (e.g. Internet, CDN) application/content versions/copies; and, the receipt and execution of updates of changes made to remotely hosted (e.g. Internet, CDN) content/application records.

Figure 2A:
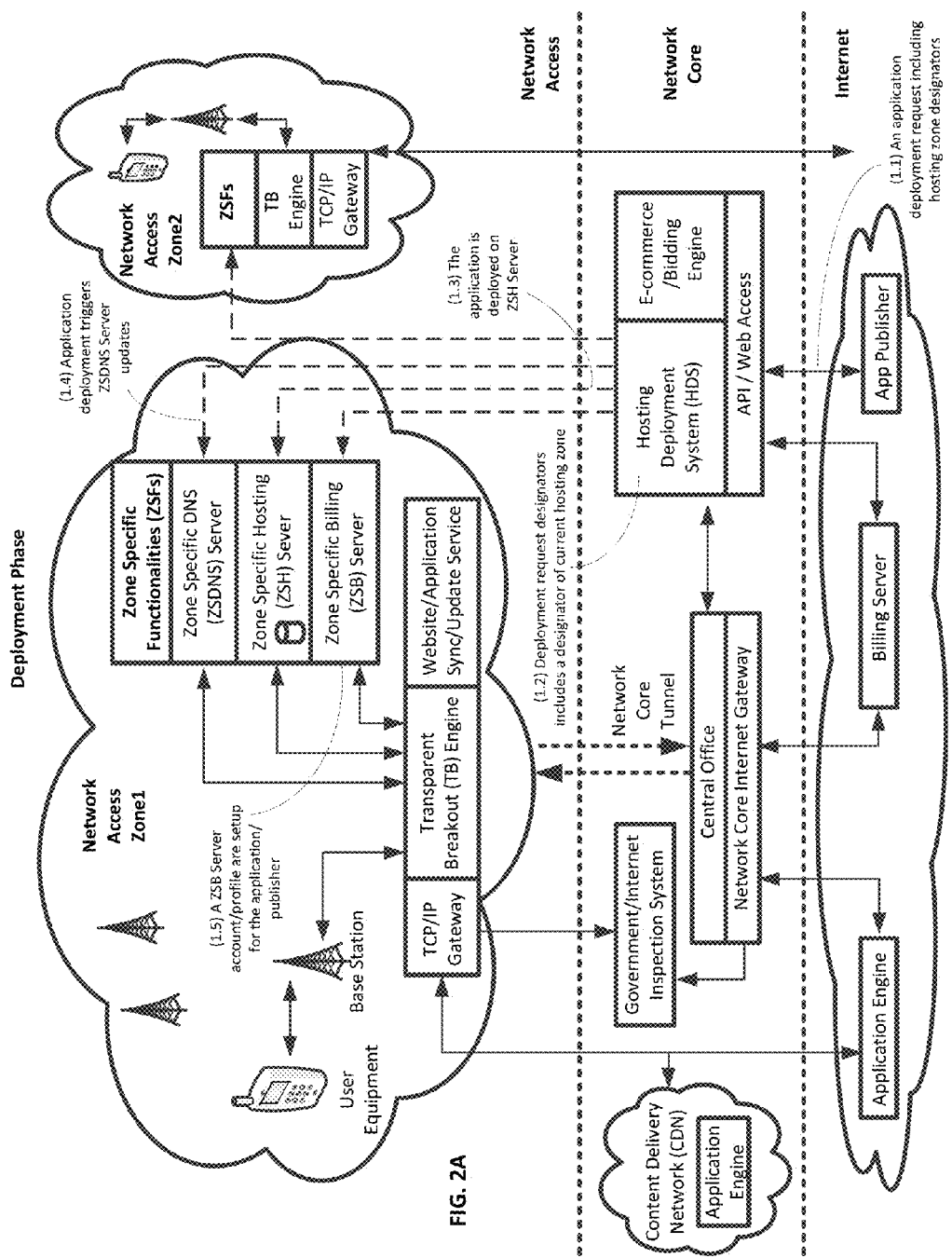
FIG. 2A is a functional block diagram showing the main sub-systems, modules, components, and relationships, of an exemplary system for facilitating local hosting and access of internet based information; wherein an exemplary application deployment process onto designated ZSH server(s) is shown, in accordance with some embodiments of the present invention.

In FIG. 2A there is shown, a functional block diagram of the main sub-systems, modules, components, and relationships, of an exemplary system for facilitating local hosting and access of internet based information; wherein an exemplary application deployment process onto designated ZSH server(s) is shown, in accordance with some embodiments of the present invention. Initially, an application deployment request, including hosting zone designators, from an Application Publisher is received at the HDS through an API/Web-Access module. The HDS, based on the hosting zone designators, deploys the application to the designated ZSH Server(s). The application deployment triggers record set-ups/updates to: the ZSDNS Server(s) records associated with the designated ZSH Server(s) to which the application has been deployed; and ZSB Server(s) records, such as the setting of an account/profile for the hosted application or the hosted application's publisher, associated with the designated ZSH Server(s) to which the application has been deployed.

Figure 2B:
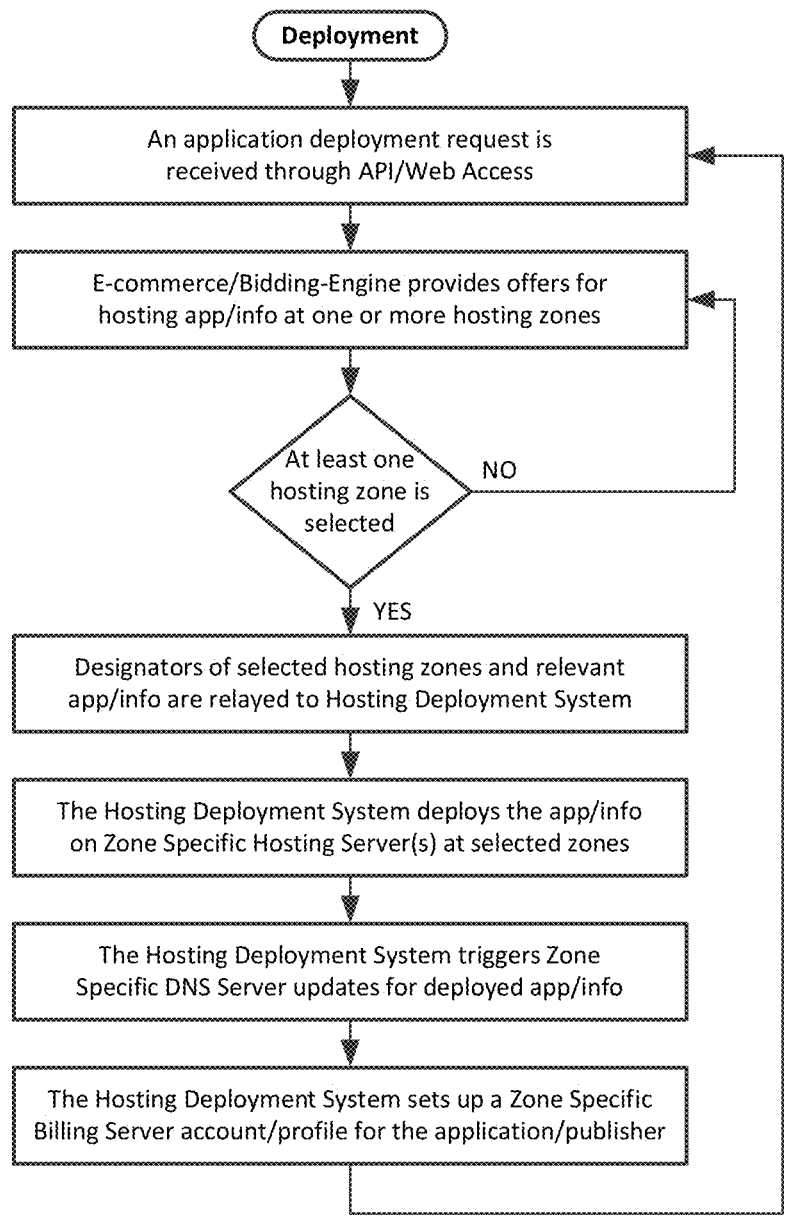
FIG. 2B is a flowchart including the main processes and steps of an exemplary application information deployment process, in accordance with some embodiments of the present invention.

In FIG. 2B there is shown, a flowchart including the main processes and steps of an exemplary application information deployment process, in accordance with some embodiments of the present invention.

Figure 3A:
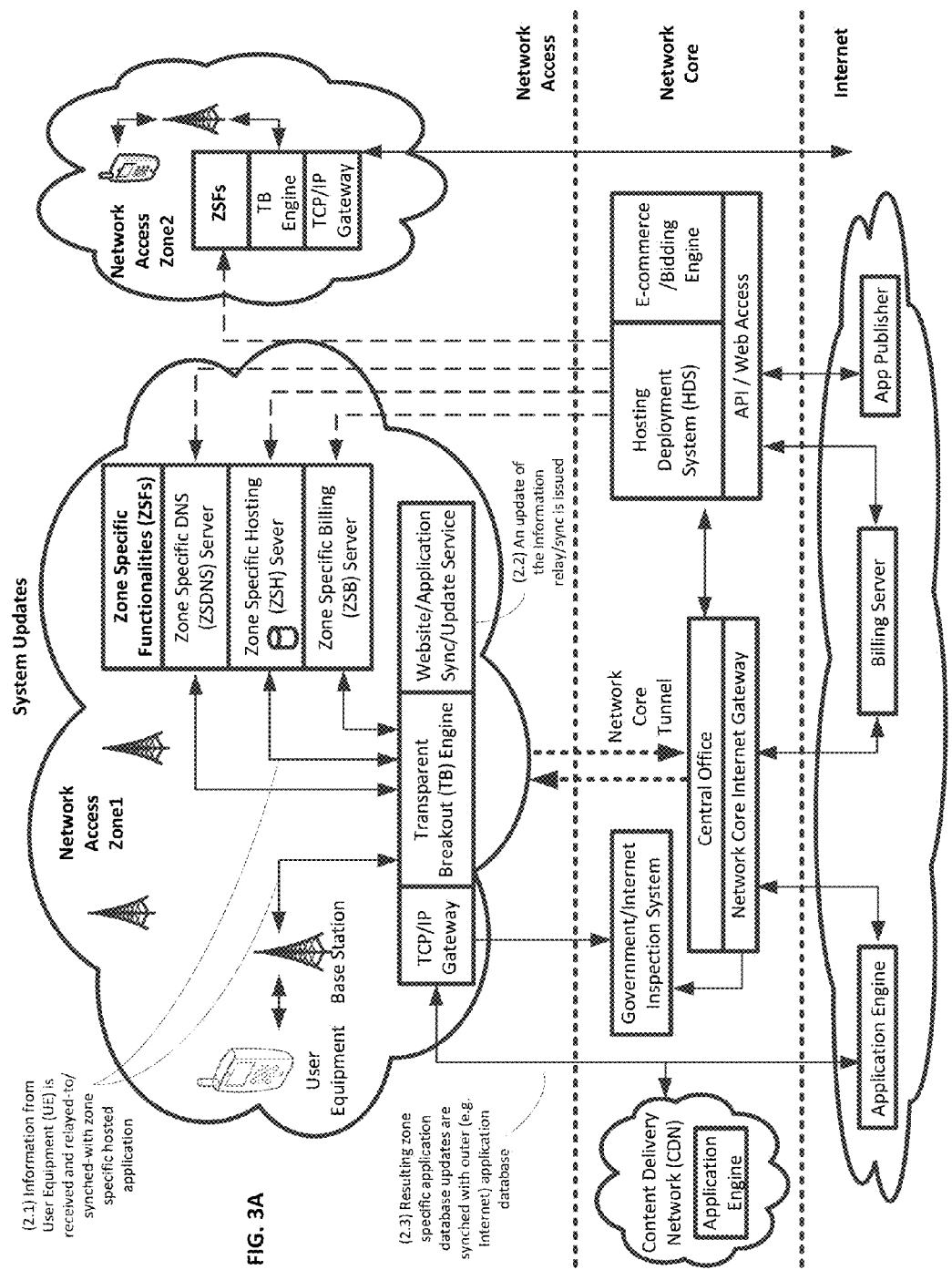
FIG. 3A is a functional block diagram showing the main sub-systems, modules, components, and relationships, of an exemplary system for facilitating local hosting and access of internet based information; wherein external (e.g. Internet) application information update process, executed in accordance with locally made changes to corresponding application information on ZSH server(s), is shown, in accordance with some embodiments of the present invention.

In FIG. 3A there is shown, a functional block diagram of the main sub-systems, modules, components, and relationships, of an exemplary system for facilitating local hosting and access of internet based information; wherein external (e.g. Internet) application information update process, executed in accordance with locally made changes to corresponding application information on ZSH server(s), is shown, in accordance with some embodiments of the present invention. Information, associated with zone specific hosted application(s), is received from a UE. The TB Engine relays the information and/or synchs the information with corresponding application(s) records/versions/copies/instances on the ZSH Server database(s). A Website/Application Sync/Update Service monitors application(s) information relays/synchs to the ZSH Servers and accordingly issues updates, of the locally made changes, to outer/remote (e.g. Internet, CDN) application engine(s)/database(s) records/versions/copies. The TB, in accordance with some embodiments, further receives and relays updates, of application(s) information changes made to outer/remote (e.g. Internet, CDN) application engine(s)/database(s) records/versions/copies, to the Website/Application Sync/Update Service for issuing corresponding updates to locally hosted application(s) records/versions/copies on the ZSH Server database(s).

Figure 3B:
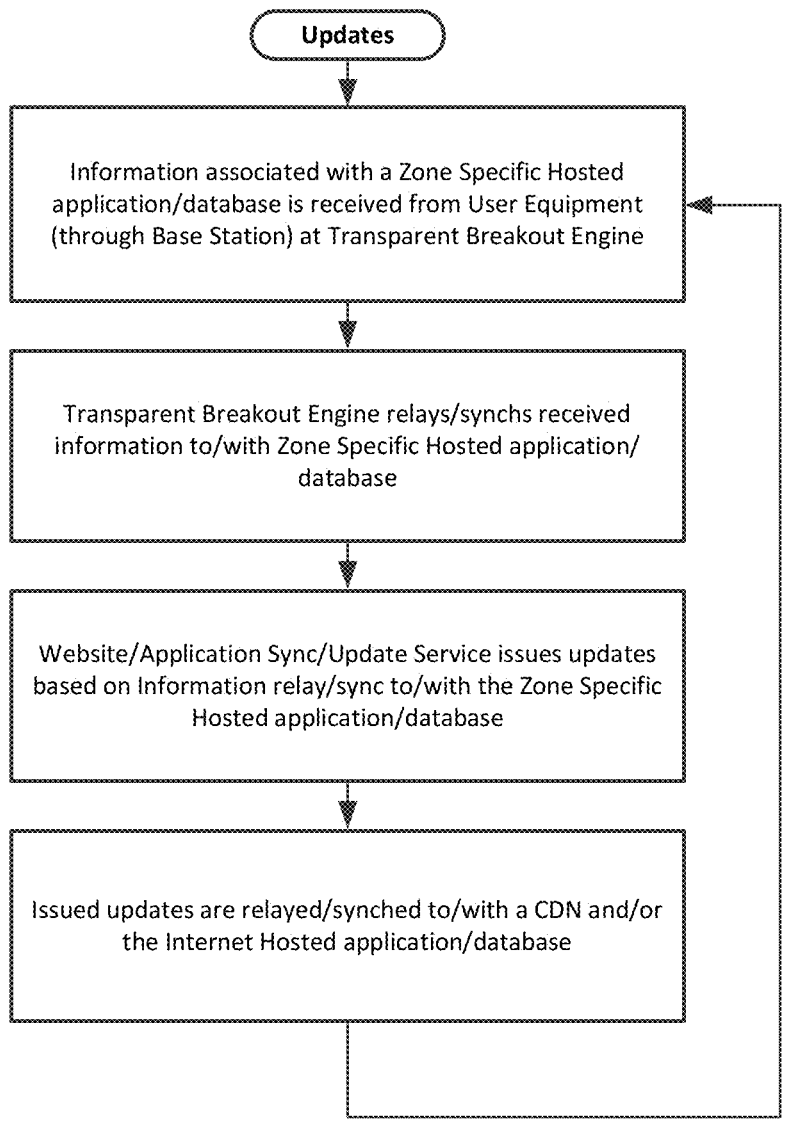
FIG. 3B is a flowchart including the main processes and steps of an exemplary application information update process, in accordance with some embodiments of the present invention.

In FIG. 3B there is shown, a flowchart including the main processes and steps of an exemplary application information update process, in accordance with some embodiments of the present invention.

In FIG. 4A there is shown, a functional block diagram showing the main sub-systems, modules, components, and relationships, of an exemplary system for facilitating local hosting and access of internet based information; wherein, as part of the operation process, user requested application information is accessed either locally (ZSH server(s)), and/or externally (the Internet), based on the availability or in-availability, of a corresponding local DNS record on a ZSDNS Server(s), in accordance with some embodiments of the present invention. Upon receipt of a request from a UE application to access an application related information/data from an application engine and/or application database, the TB Engine references the ZSDNS Server checking for requested information/data matching DNS records. If the TB Engine resolves that the requested application, and/or requested related information/data, is stored locally (e.g. local ZSDNS records of application records/versions/copies/instances on the ZSH Server found), it enables/routs/directs the UE to access the local records/versions/copies/instances of the application, stored on ZSH Server(s). Conversely, If the TB Engine resolves that the requested application, and/or requested related information/data, is not stored locally (e.g. local ZSDNS records of application records/versions/copies/instances on the ZSH Server not found), it enables/routs/directs the UE to access the remote records/versions/copies/instances of the application, stored on the Internet and/or on a CDN(s).

Figure 4B:
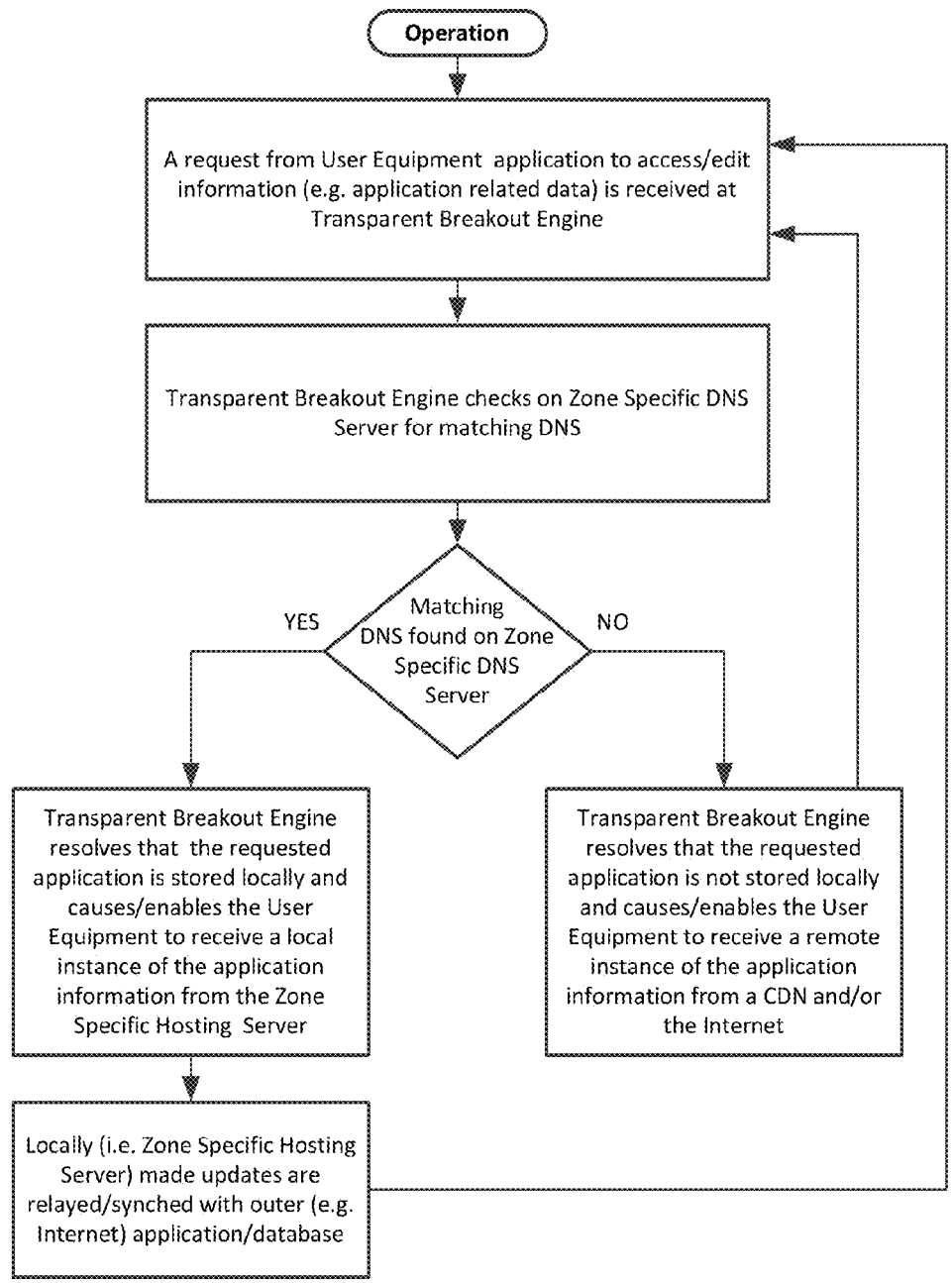
FIG. 4B is a flowchart including the main processes and steps of an exemplary application information access/retrieval process, in accordance with some embodiments of the present invention.

In FIG. 4B there is shown, a flowchart including the main processes and steps of an exemplary application information access/retrieval process, in accordance with some embodiments of the present invention.

According to some embodiments of the present invention, a system for facilitating local hosting and access of content, may comprise: one or more Zone Specific Hosting (ZSH) Server(s) that may host content associated with a specific zone of a wireless or cellular network; one or more Zone Specific Domain Name System (ZSDNS) Server(s) that may store records of content stored on one or more of said one or more ZSH Server(s); and/or a Hosting Deployment System (HDS) that may deploy content to one or more of the ZSH Server(s) and may update records of one or more of said ZSDNS Server(s) in accordance.

According to some embodiments, a Transparent Breakout (TB) Engine may provide a User Equipment (UE) client device access to content from outside the wireless or cellular network in the event that the requested content is not hosted on said ZSH Server(s) as per ZSDNS Server(s) records.

According to some embodiments, the Hosting Deployment System (HDS) may further verify and approve content to be deployed to ZSH Server(s).

According to some embodiments, the Hosting Deployment System (HDS) may further comprise an E-commerce Bidding Engine that may present financial offers for zone specific hosting services, accept financial bids for offered services from content/application up-loaders/publishers, and/or select winning bids.

According to some embodiments, a Zone Specific Billing (ZSB) Server may monitor access and usage of content hosted on the ZSH Server(s) of a specific network zone and may accordingly handle zone specific billing tasks.

According to some embodiments, a Website/Application Sync/Update Service may monitor and relay data indicative of changes made to content hosted on ZSH Server(s), to corresponding externally stored versions of the same content.

According to some embodiments of the present invention, a method for facilitating local hosting and access of content, may comprise: deploying and hosting content associated with a specific zone of a wireless or cellular network to one or more Zone Specific Hosting (ZSH) Server(s); and/or updating records of one or more Zone Specific Domain Name System (ZSDNS) Server(s) in accordance with the deployment of the zone specific associated content.

According to some embodiments, the method may further comprise providing a User Equipment (UE) client device access to content from outside the wireless or cellular network in the event that the requested content is not hosted on the ZSH Server(s) as per ZSDNS Server(s) records.

According to some embodiments, the method may further comprise verifying and approving content to be deployed to the ZSH Server(s).

According to some embodiments, the method may further comprise presenting financial offers for zone specific hosting services; accepting financial bids for offered services from content/application up-loaders/publishers; and/or selecting winning bids.

According to some embodiments, the method may further comprise monitoring access and usage of content hosted on the ZSH Server(s) of a specific network zone and accordingly handling zone specific billing tasks.

According to some embodiments, the method may further comprise monitoring and relaying data indicative of changes made to content hosted on the ZSH Server(s) to corresponding externally stored versions of the same content.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for facilitating local hosting of application engines, said system comprising:
 a cellular network infrastructure divided into multiple access zones, each given access zone infrastructure providing cellular service to a different given geographical area and comprising:
 cellular access points dedicated to providing cellular service to cellular devices within the given geographical area;
 one or more Zone Specific Hosting (ZSH) Server(s), communicatively coupled to said access points and configured to host local instances of first application engines dedicated to providing service to corresponding client applications running on cellular devices within the given geographical area;

one or more Zone Specific Domain Name System (ZSDNS) Server(s) communicatively coupled to said access points and configured to store records of the first application engines stored on said one or more ZSH Server(s) and redirect requests from the corresponding client applications running on cellular devices within the given geographical area to the local instances of the first application engines; and a Hosting Deployment System (HDS) comprising computing devices and computer-usable or computer-readable mediums providing program code configured to cause the computing devices to:

(i) receive through an application programming interface (API) requests for application engine deployment of one or more second application engines from one or more application publisher systems;

(ii) receive, for each individual application engine of the second application engines, zone designators of access zones in which to deploy the individual application engine;

(iii) deploy each individual application engine to ZSH Server(s) which are within the access zones designated for the individual application engine; and update records within said ZSDNS Server(s) to reflect the deployment of the second application engines.

2. The system according to claim 1, further comprising a Transparent Breakout (TB) Engine comprising a second computing device and computer-usable or computer-readable mediums providing program code configured to cause the second computing device to provide a User Equipment (UE) client device access to content directly from outside the cellular network.

3. The system according to claim 1, wherein said Hosting Deployment System (HDS) further comprising a second computing device and computer-usable or computer-readable mediums providing program code configured to cause the second computing device to verify and approve application engines to be deployed to ZSH Server(s).

4. The system according to claim 1, wherein said Hosting Deployment System (HDS) further comprises an E-commerce Bidding Engine comprising a second computing device and computer-usable or computer-readable mediums providing program code configured to cause the second computing device to present financial offers for zone specific hosting services, accept financial bids for offered services from application up-loaders or publishers and select winning bids.

5. The system according to claim 1, further comprising a Zone Specific Billing (ZSB) Server communicatively coupled to said access points and configured to monitor access and usage of content hosted on the ZSH Server(s) of a specific network zone and to accordingly handle zone specific billing tasks.

6. The system according to claim 1, further comprising a second computing device and computer-usable or computer-readable mediums providing program code configured to cause the second computing device to monitor and relay data indicative of changes made to content hosted on ZSH Server(s).

7. A method for facilitating local hosting of application engines, said method comprising:

within a cellular network infrastructure divided into multiple access zones, each given access zone infrastructure providing cellular service to a different given geographical area and comprising cellular access points dedicated to providing cellular service to cellular devices within the given geographical area;

deploying and hosting local instances of first application engines dedicated to provide service to corresponding client applications running on cellular devices within the given geographical area on one or more Zone Specific Hosting (ZSH) Server(s) communicatively coupled to said access points;

updating records of the first application engines stored on the ZSH Servers within Zone Specific Domain Name System (ZSDNS) Server(s) in accordance with said deployment;

redirecting requests from the corresponding client applications to the local instances of the first application engines, based on the records within the ZSDNS;

receiving through an application programming interface (API) requests for application engine deployment of one or more second application engines from one or more application publisher systems;

receiving, for each individual application engine of the second application engines, zone designators of access zones in which to deploy the individual application engine;

deploying each individual application engine to ZSH Server(s) which are within the access zones designated for the individual application engine; and updating records within said ZSDNS Server(s) to reflect the deployment of the second application engines.

8. The method according to claim 7, further comprising providing a User Equipment (UE) client device direct access to content from outside the cellular network.

9. The method according to claim 7, further comprising verifying and approving application engines to be deployed to the ZSH Server(s).

10. The method according to claim 7, further comprising:

presenting financial offers for zone specific hosting services;

accepting financial bids for offered services from application up-loaders or publishers; and selecting winning bids.

11. The method according to claim 7, further comprising monitoring access and usage of application engines hosted on the ZSH Server(s) of a specific network zone and accordingly handling zone specific billing tasks.

12. The method according to claim 7, further comprising monitoring and relaying data indicative of changes made to application engines hosted on the ZSH Server(s).

* * * * *